(12) United States Patent
Coffey et al.

(10) Patent No.: US 7,690,111 B2
(45) Date of Patent: Apr. 6, 2010

(54) METHOD AND APPARATUS FOR REPAIRING TURBINE ROTOR

(75) Inventors: James Harvey Coffey, Walworth, WI (US); Andrew Otto Ruehs, Waukesha, WI (US)

(73) Assignee: Mechanical Dynamics and Analysis, LLC, Latham, NY (US)

( * ) Notice: Subject to any disclaimer, the term of this patent is extended or adjusted under 35 U.S.C. 154(b) by 372 days.

(21) Appl. No.: 11/106,234

(22) Filed: Apr. 14, 2005

(65) Prior Publication Data
US 2006/0230612 A1    Oct. 19, 2006

(51) Int. Cl.
*B23P 6/00* (2006.01)
(52) U.S. Cl. ............... 29/889.1; 29/402.07; 29/402.08; 29/402.11; 29/402.13; 228/119
(58) Field of Classification Search ............ 29/888.011, 29/889.1, 402.07, 402.08, 402.09, 402.11, 29/402.12, 402.13; 228/119, 104, 165, 172, 228/174
See application file for complete search history.

(56) References Cited
U.S. PATENT DOCUMENTS

| | | | |
|---|---|---|---|
| 3,067,490 A * | 12/1962 | Luthy et al. ............... | 29/889.2 |
| 4,213,025 A | 7/1980 | Kuhen | |
| 4,633,554 A | 1/1987 | Clark et al. | |
| 4,657,171 A | 4/1987 | Robins | |
| 4,896,814 A | 1/1990 | Allain et al. | |
| 4,903,888 A | 2/1990 | Clark et al. | |
| 4,958,431 A | 9/1990 | Clark et al. | |
| 5,172,475 A | 12/1992 | Amos et al. | |
| 5,174,011 A | 12/1992 | Weigelt | |
| 5,215,243 A | 6/1993 | Findlan | |
| 5,280,849 A | 1/1994 | Galanes | |
| 5,806,751 A | 9/1998 | Schaefer et al. | |
| 6,085,417 A | 7/2000 | Anderson, III et al. | |
| 6,607,114 B2 * | 8/2003 | Reser et al. ............... | 228/49.1 |
| 6,754,955 B1 | 6/2004 | Carl, Jr. et al. | |
| 6,849,972 B1 * | 2/2005 | Barnes et al. ............... | 310/42 |

* cited by examiner

*Primary Examiner*—David P Bryant
*Assistant Examiner*—Sarang Afzali
(74) *Attorney, Agent, or Firm*—Heslin Rothenberg Farley & Mesiti P.C.; Victor A. Cardona, Esq.

(57) ABSTRACT

A method for repairing a rotor of a turbine includes providing a rotor having a groove portion defined by a circumferential portion of the rotor. The circumferential portion of the rotor is removed to create an opening to provide access to the groove such that the opening, immediately adjacent the groove, is narrower than the groove. A guide block may be extended into a receiving slot separating a first protruding surface from a second protruding surface of the rotor such that a weld area slot of the guide block extends over at least a portion of the opening. The opening may be welded adjacent the guide block to close at least a portion of the opening.

20 Claims, 12 Drawing Sheets

METHOD AND APPARATUS FOR REPAIRING TURBINE ROTOR

TECHNICAL FIELD

This invention relates, in general, to turbines and, in particular, to systems and methods for repairing rotors of turbines.

BACKGROUND ART

Turbine rotors often experience cracking requiring repair before the end of their design life due to the environment associated with such turbines (e.g., high temperatures and/or pressures). For example, a rotor 10 (FIG. 1) may experience cracking in at least two locations at or before half of the design life thereof is consumed. Such cracking may occur at the bottom of an L-Groove cooling slot formed in the rotor and at a fabrication weld formed in bridge rails thereof. The bridge rails may support heat shields during operation of the turbine, which are mounted axially in openings between the bridge rails. Bottoms of the L-Grooves may experience cracking due to low cycle fatigue and poor geometry. High local mechanical stresses resulting from the original weld geometry of the bridge rails may cause premature low cycle fatigue cracking in the fabrication weld.

The cracks formed in such turbine rotors are conventionally repaired by machining an opening 300 in a circumferential portion 310 of the rotor which is the same width as a top end of an L-Groove 320 as depicted in FIG. 2. In particular, any cracks in circumferential portion 310 (e.g., in a fabrication weld thereof) or at a bottom end 321 of L-Groove 320 may be removed by machining through the opening created. After machining the cracks from groove 320, the groove may be closed by welding the opening shut. The location of a conventional weld does not allow a gentle transition between the weld and sidewalls 330 of the groove. Instead, a sharp angle is formed at an intersection 340 between a conventional weld 331 and adjacent side walls of the groove. Such an abrupt transition created by such a conventional weld increases stress in the area of the weld and allows for premature failure. Further, such a repair causes heat effected zones of the welds to be placed in such stressed areas.

Thus, a need exists for an improved method for repairing cracks in turbine rotors.

SUMMARY OF THE INVENTION

The present invention provides, in a first aspect, a method for repairing a rotor of a turbine which includes providing a rotor having a groove defined by a circumferential portion of the rotor. The method further includes removing a part of the circumferential portion of the rotor to create an opening to provide access to the groove such that the opening immediately adjacent to the groove is narrower than the groove.

The present invention provides, in a second aspect, a method for use in closing an opening in an object having a plurality of protruding surfaces forming an intermittent geometry. The method includes extending a guide block into a receiving slot separating a first protruding surface from a second protruding surface of the object such that a weld area slot of the guide block extends over at least a portion of the opening. The opening is welded adjacent the guide block to close at least a portion of the opening.

The present invention provides, in a third aspect, a system for use in closing an opening in an object having an intermittent geometry which includes a member configured to be received in a receiving slot of the object with the slot having an edge defining a side of the opening. The member includes a central portion, at least one outer portion, and an outer surface. A core connects the central portion and the at least one outer portion. At least one breakaway cut includes a space separating the central portion and the at least one outer portion. The space extends from the core to the outer surface to allow the central portion to be separated from the at least one outer portion in response to the core being removed.

The present invention provides, in a fourth aspect, a system for use in repairing a groove of a rotor of a turbine which includes a lathe tool configured to extend through an opening in the rotor into the groove. The opening, immediately adjacent the groove, is narrower than the groove. The lathe tool includes a shaping portion which is configured to contact the wall of the groove to shape the groove in response to the rotor being rotated in contact with the contacting portion.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

DETAILED DESCRIPTION

In accordance with the principles of the present invention, systems and methods for repairing cracks in a rotor of a turbine and other objects having an intermittent geometry are provided.

Figure 1:
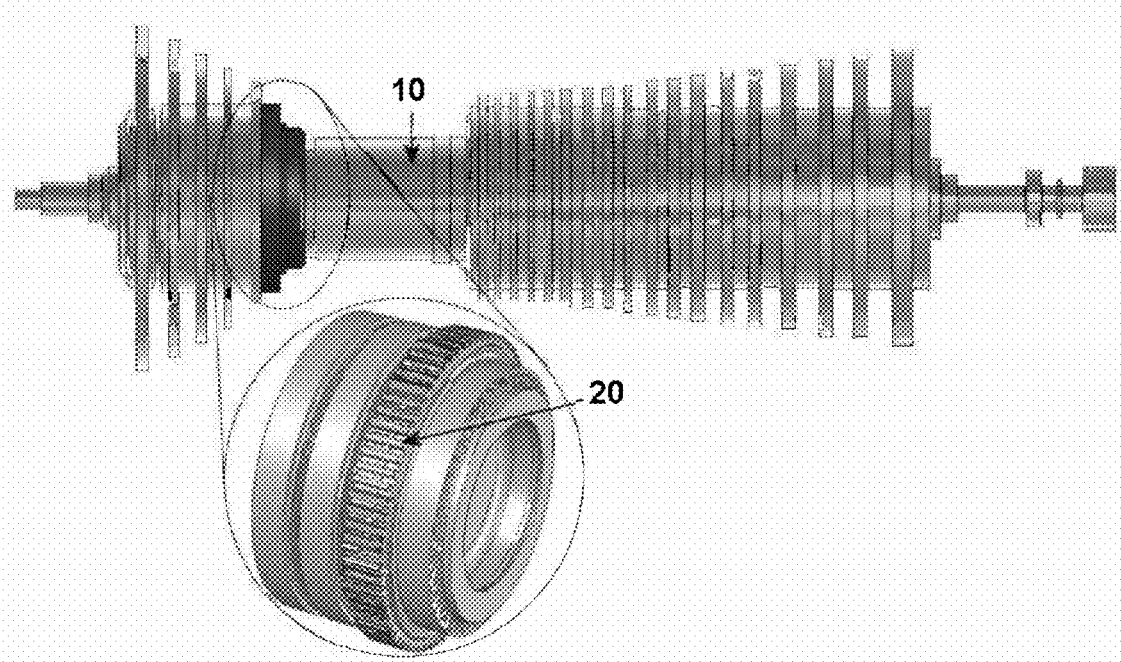
FIG. 1 is a perspective view of a turbine rotor.
Figure 3:
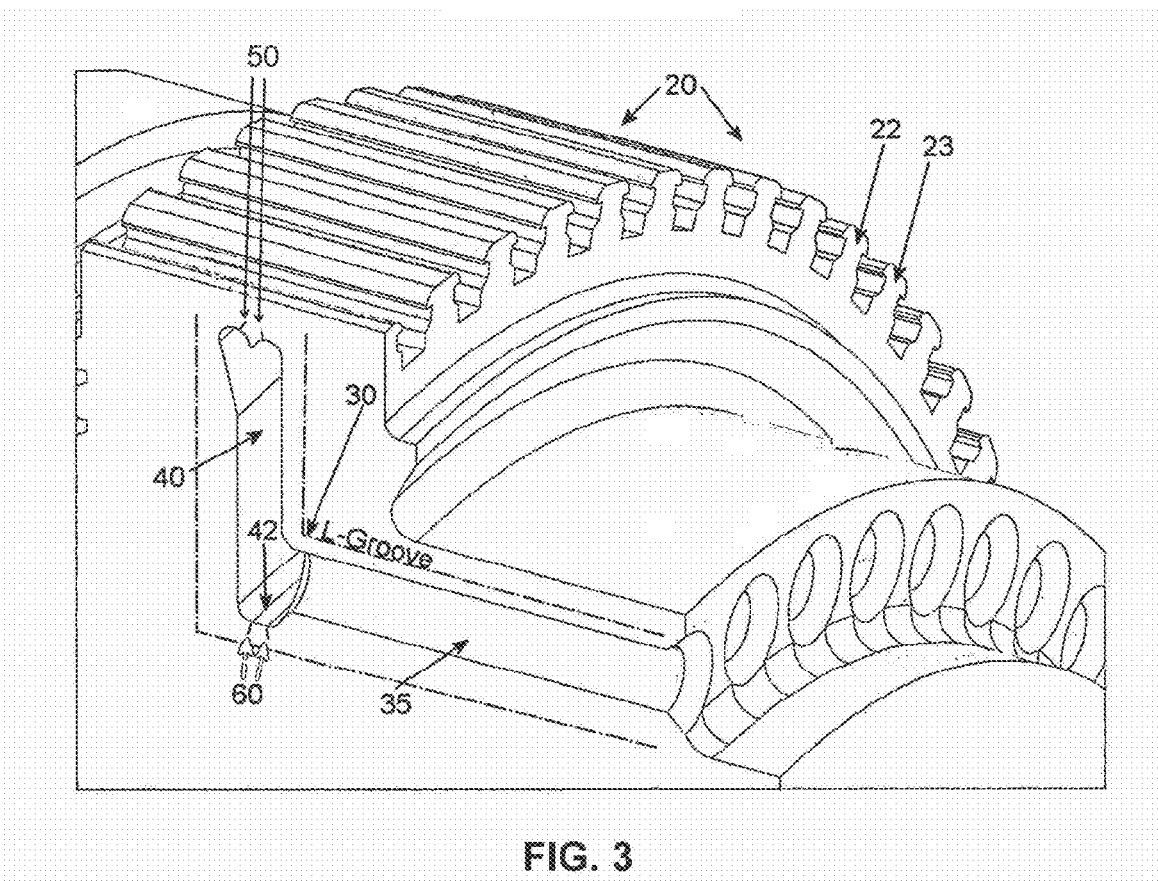
FIG. 3 is a perspective cross-sectional view of an L-Groove of the rotor of FIG. 1.
Figure 4:
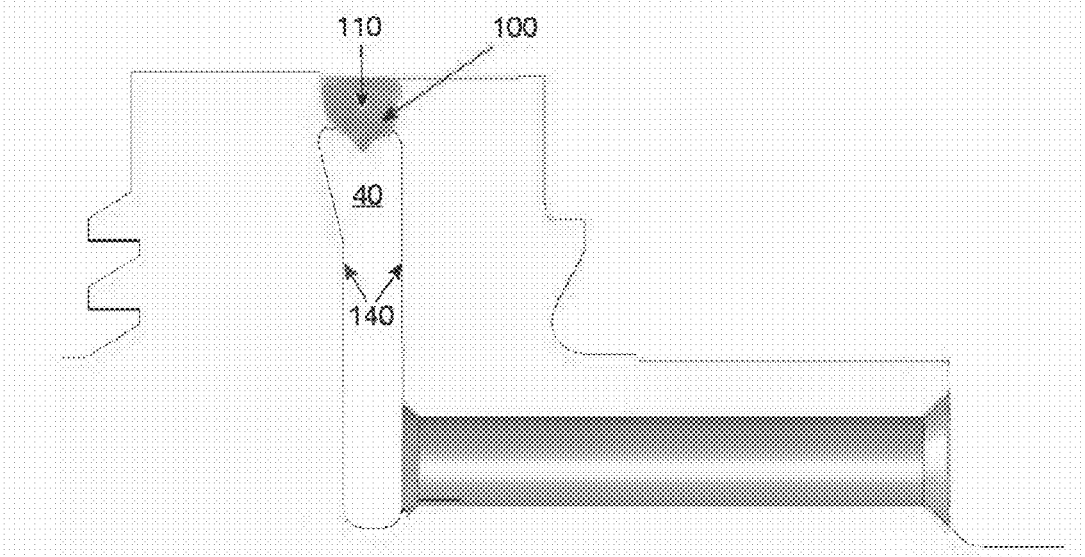
FIG. 4 is a side cross-sectional view of the L-groove of FIG. 3.

As depicted in FIG. 3, a rotor 10 (FIG. 1) of a turbine (not shown) includes bridge rails 20 which extend radially outwardly and are separated from one another and may have heat shields (not shown) axially located in spaces between the rails during turbine operation. As depicted in FIG. 3, rotor 10 may include an L-Groove 30 having an axial portion 35 and a radial portion 40. Rotor 10 may be formed of chromium molybdenum type steel alloy, other steel alloys, or other such materials preferred to be utilized in turbine environments. As depicted in FIG. 4, an initial fabrication of rotor 10 results in a weld 100 (e.g., a fabrication weld) at a top or outer radial end of radial portion 40. After a period of use, radial portion 40 may develop upper cracks 50 in a portion of rotor 10 defining an upper end thereof (e.g., in weld 100) as depicted in FIG. 3. Lower cracks 60 may also occur at a bottom end 42 of radial portion 40. For example, the configuration and orientation of fabrication weld 100 and the effect of thermal fatigue on such fabrication weld and the remainder of L-Groove 30 may result in cracks 50 and cracks 60 after a period of use of rotor 10.

Upper cracks 50 and lower cracks 60, as depicted in FIG. 3, may weaken rotor 10 thereby causing a danger of failure thereof. Cracks 50 may be removed from rotor 10 by machining away (e.g., via a metal lathe) or otherwise removing a circumferential portion 110 (e.g., a portion of one rail of bridge rails 20 adjacent and including weld 100) of rotor 10 to create an opening 120 (FIG. 9), thereby providing access to radial portion 40. For example, opening 120 (FIG. 9) may be created by rotating rotor 10 and contacting circumferential portion 110 with a fixed lathe tool (e.g., any industry standard lathe tooling of a rigid or insert style) to cause circumferential portion 110 to be gradually removed as rotor 10 rotates against the lathe tool. Such rotation may also create additional openings in other rails of bridge rails 20 to form a circumferential groove (e.g., circumferential groove 121, FIG. 11) around rotor 10.

Figure 5:
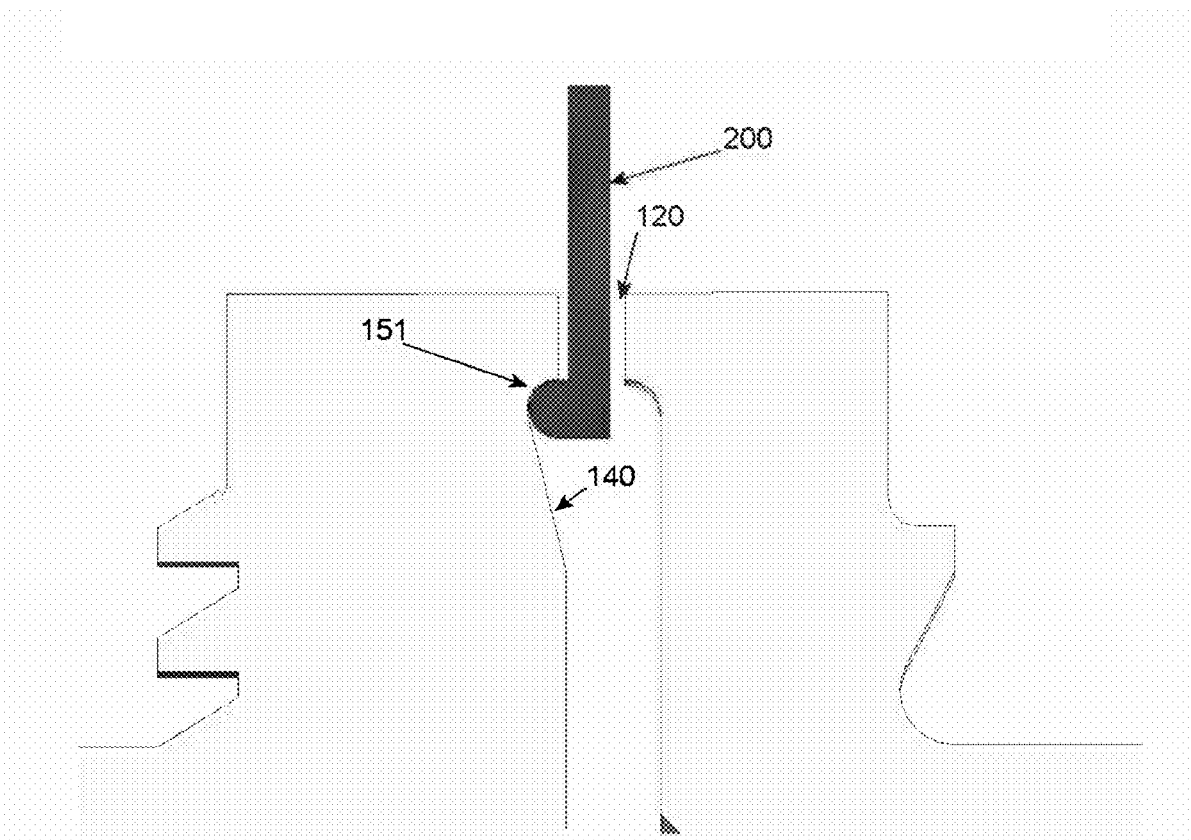
FIG. 5 is a side cross-sectional view of a lathe tool inserted in the groove of FIG. 3 and being utilized to form a curved portion connecting an opening and sidewall of the groove.
Figure 6:
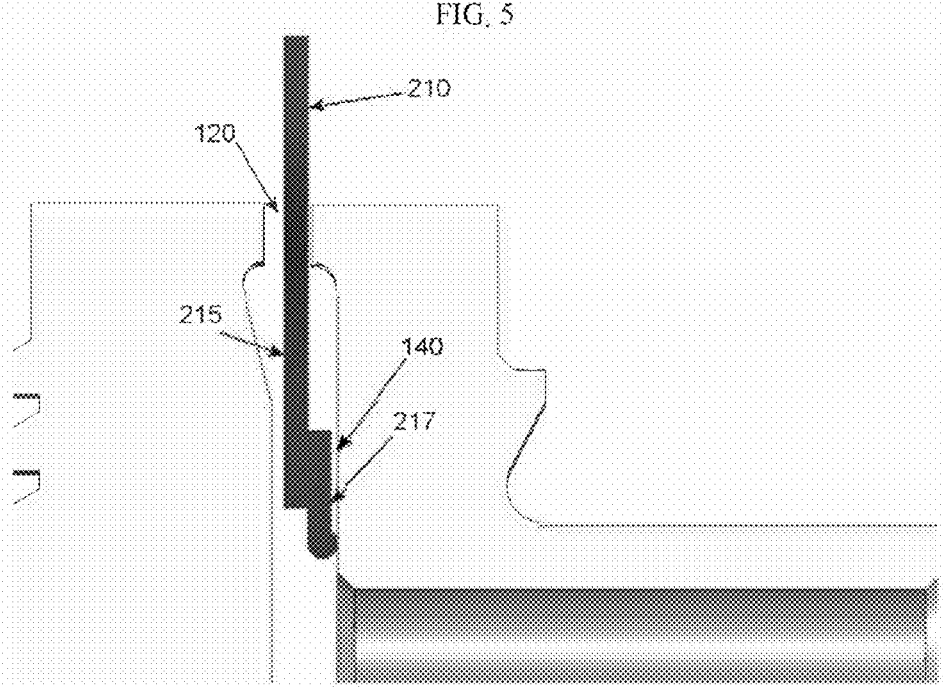
FIG. 6 is a side cross-sectional view of a lathe tool inserted in the groove of FIG. 3 and being utilized to form a side wall of the groove.
Figure 9:
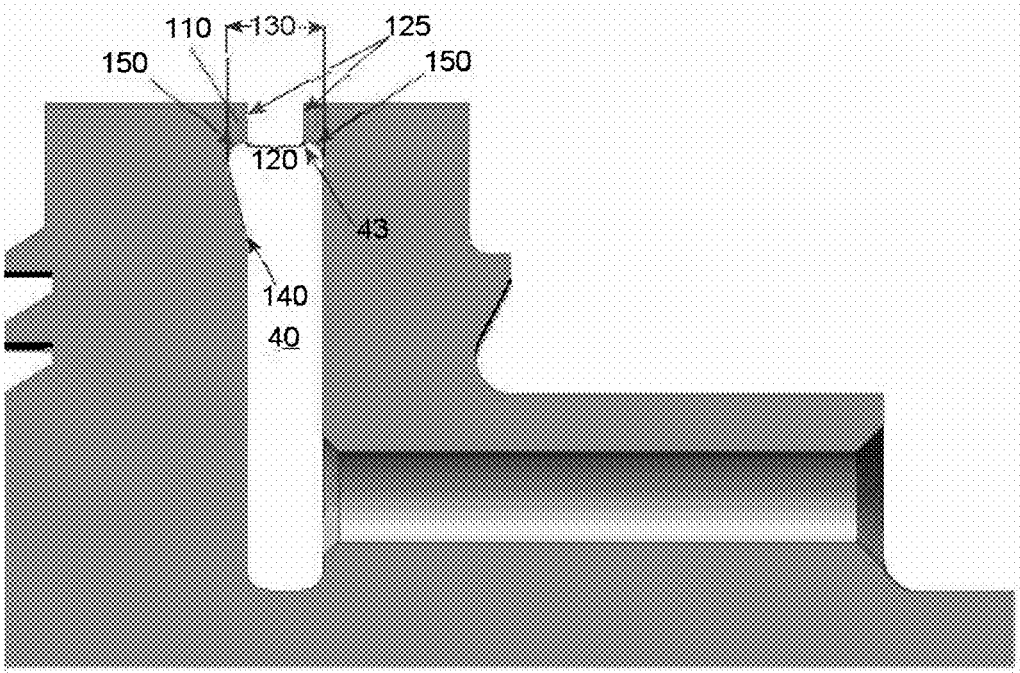
FIG. 9 is an enlarged side cross-sectional view of an upper end of the L-groove of FIG. 8 with an opening therein prior to the opening in the rotor being closed.

Opening 120, immediately adjacent the L-groove (e.g., radial portion 40), may be narrower than the groove as depicted in FIG. 9. For example, opening 120 may be narrower in a transverse direction relative to a longitudinal dimension of radial portion 40 than a width 130 of radial portion 40. Further, opening 120 may be formed offset (e.g., spaced from) sidewall 140 of radial portion 40. Sidewalls 140 may be machined to result in curved portions 150 connecting side walls 140 to sides 125 of opening 120. For example, curved portions 150 may have a curvature of about a ¼ inch diameter circle and opening 120 may be about ¾ inch wide while width 130 may be about 1 inch. Sidewalls 140 and curved portions 150 may also be formed using lathe tools and by rotating rotor 10. For example, as depicted in FIG. 5, a curved portion 151 may be formed utilizing a lathe tool 200 extending through opening 120 as rotor 10 rotates. FIG. 6 depicts a lathe tool 210 extending through opening 120 and forming a portion of sidewalls 140.

Figure 7:
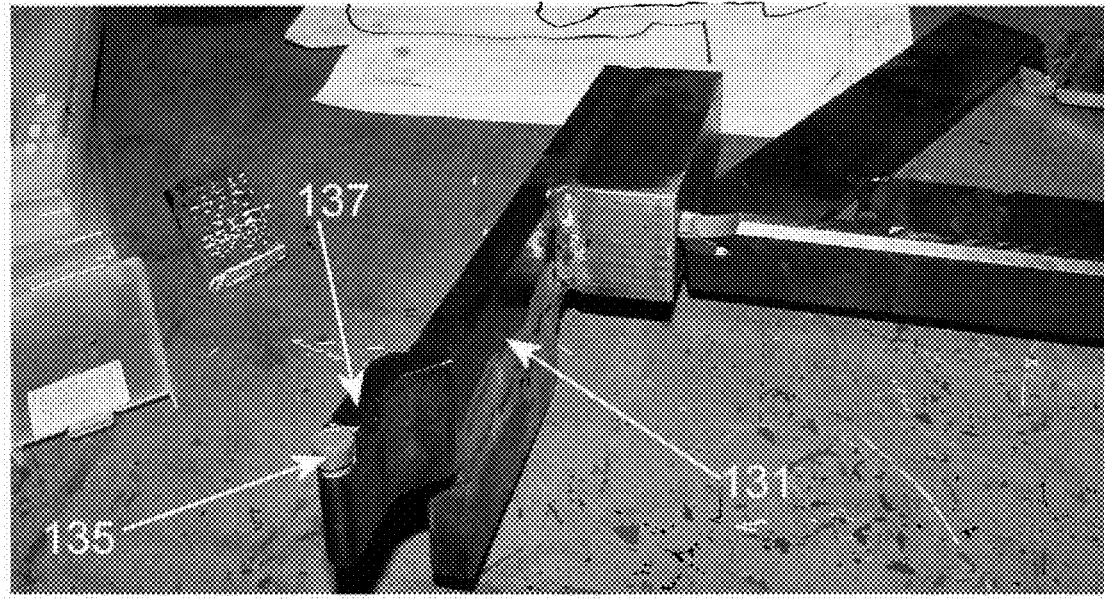
FIG. 7 is a perspective view of a lathe tool utilized to form a bottom corner of the groove of FIG. 3.

Lathe tool 210 may include, for example, a main portion 215 and offset portion 217. Main portion 215 is substantially aligned with opening 120 and offset portion 217 is offset from main portion 215 and opening 210 (i.e., misaligned relative to opening 210 and a longitudinal axis of main portion 215) to allow it to contact one of sidewalls 140 to form the sidewalls in a particular desired geometrical configuration. FIG. 7 depicts a lathe tool 131 which may be utilized to form a bottom corner 46 (FIG. 8) of radial portion 40.

Figure 8:
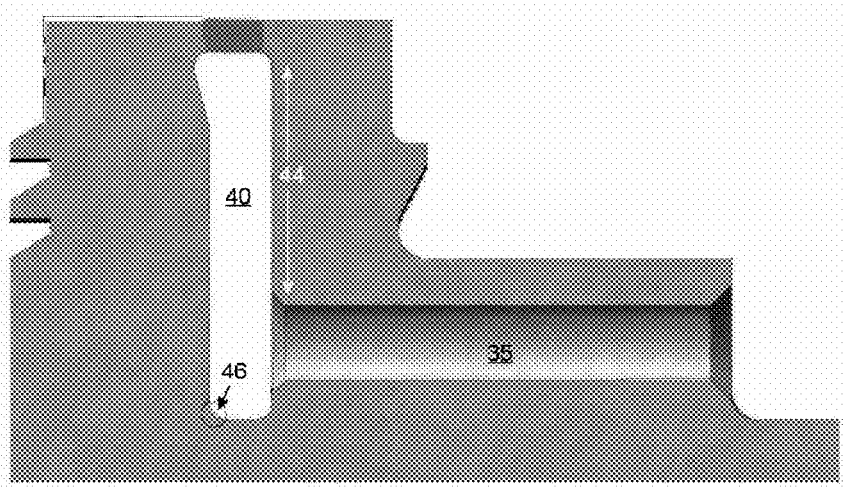
FIG. 8 is a cross-sectional view of the L-groove of the rotor of FIG. 1 after removing cracks in the rotor and closing an opening in the rotor.

Lathe tool 131 may include a lathe tool insert 135 for shaping bottom corner 46 (FIG. 8). Insert 135 may be a hardened and shaped bit which is attachable to tool 131 to allow a particular shape to be formed in a body (e.g., rotor 10) which are rotating in contact with insert 135. Also, tool 131 includes an offset portion 137 to allow insert 135 to be located offset from opening 120 in a direction toward one of sidewalls 140 to allow insert 135 to contact one of sidewalls 140, e.g., to form bottom corner 46. As will be understood by one skilled in the art, lathe tools may be formed in any number of shapes and materials (e.g., standard square stock steel) to allow the tools themselves or insert(s) attached thereto to contact any portion of sidewalls 140 or other portion of L-groove 30 to allow sidewalls 140 or such other portion of L-groove 30 to be shaped.

Figure 2:
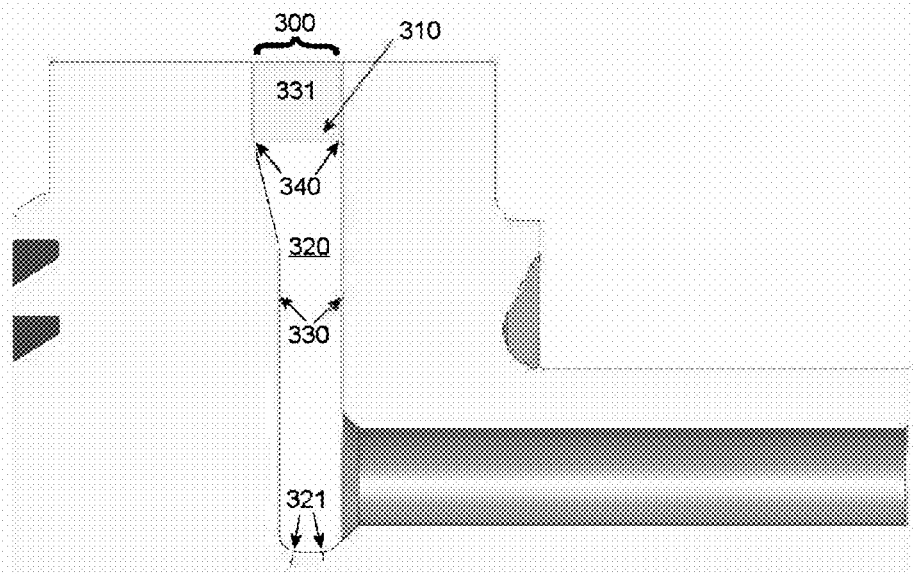
FIG. 2 is a cross-sectional view of a prior art repair of the L-groove of the rotor of FIG. 1.

The use of a narrowed opening (e.g., opening 120, FIG. 9) offset (e.g., spaced) from sidewalls of radial portion 40 to remove cracks in a fabrication weld and to access a groove (e.g., radial portion 40 of L-Groove 30) causes heat effected zones to be moved relative to a conventionally repaired weld (FIG. 2). In particular, the new weld location moves heat effected zones from a corner (e.g., intersection 340, FIG. 2) where a bridge rail meets a vertical side wall of a radial portion of a groove (i.e., in a conventionally repaired weld) to curved portions 150 connecting opening 120 to sidewalls 140 as depicted in FIG. 9, for example.

Figure 10:
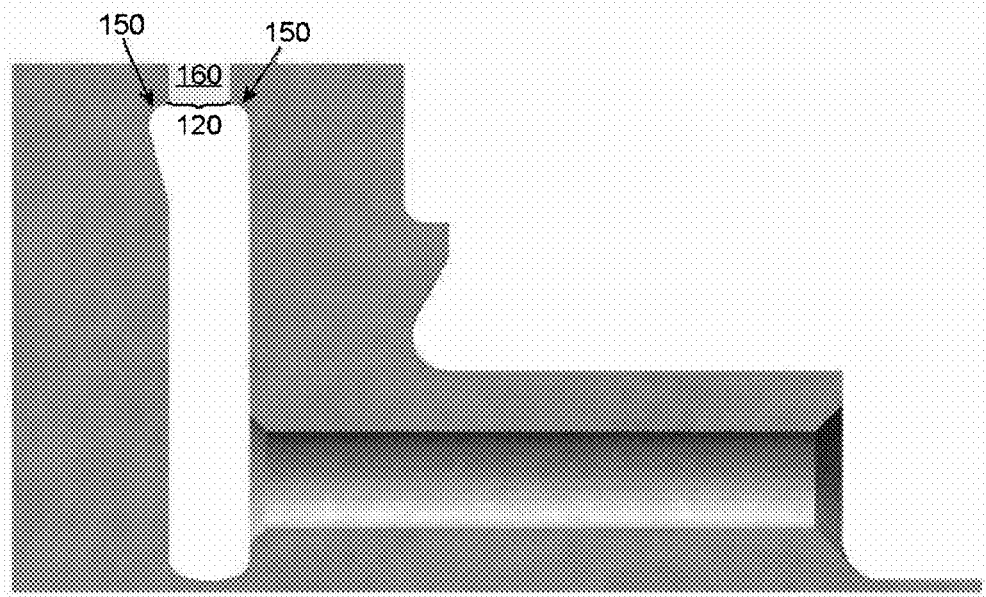
FIG. 10 is a cross-sectional view of the enlarged portion of the rotor of FIG. 9 after the opening thereof has been welded closed.

The creation of opening 120 as described differs from a conventional method for removing cracks, as depicted in FIG. 2 and described above. In particular, such prior method includes creating opening 300 in circumferential portion 310 such that opening 300 has a substantially same width as a portion of groove 320 located immediately adjacent thereto. Because the opening created via such prior method has the same width as the portion of the groove immediately adjacent thereto, there is no gentle transition between weld 331 which fills opening 300 and groove sidewalls 330. Instead, sharp angles are present at intersections 340 between weld 331 and sidewalls 330. Such abrupt transitions due to the sharp angles at intersections 340 increase stress in the area of the weld and allows for premature failure (e.g., cracking) as described above. Further, heat effected zones of the weld are located in such highest stressed areas at these abrupt transitions. In contrast, curved portions 150, as described above and depicted in FIGS. 9-10 for example, allow a gentle slope (e.g., at curved portions 150) between sidewalls 140 and weld 160. Accordingly, the curved shape of curved portions 150 along with the corresponding narrowed opening (e.g., opening 120) lower stresses during use of rotor 10 in the region of a top end 43 (FIG. 9) of radial portion 40 and circumferential portion 110, relative to a configuration of L-groove 320 in prior art crack removal methods as depicted in FIG. 2, for example. This lowered stress due to the contour of curved portions 150 extends a future operating life of a bridge rail portion 22 and bridge rails 20, for example.

Also, lower cracks 60 (FIG. 3) may be machined or otherwise removed from bottom end 42 of radial portion 40 by inserting one or more lathe tool(s) as described above (e.g., using lathe tool 131) through opening 120. Such machining of bottom end 42 removes cracks 60 and some material of rotor 10 around cracks 60 to result in a new geometry of bottom end 42. Such new geometry may be designed using finite element analysis to result in a particular geometry suited for a particular rotor, thereby reducing a likelihood of future cracking, for example. Also, in one example, side walls 140 may be machined by metal lathe tools (e.g., tool 210) inserted through opening 120 such that side walls 140 are substantially parallel to each other in a central portion 44 of radial portion 40 with central portion 44 including radial portion 40 slightly below opening 120 and slightly above axial portion 35 as depicted in FIG. 8.

Figure 11:
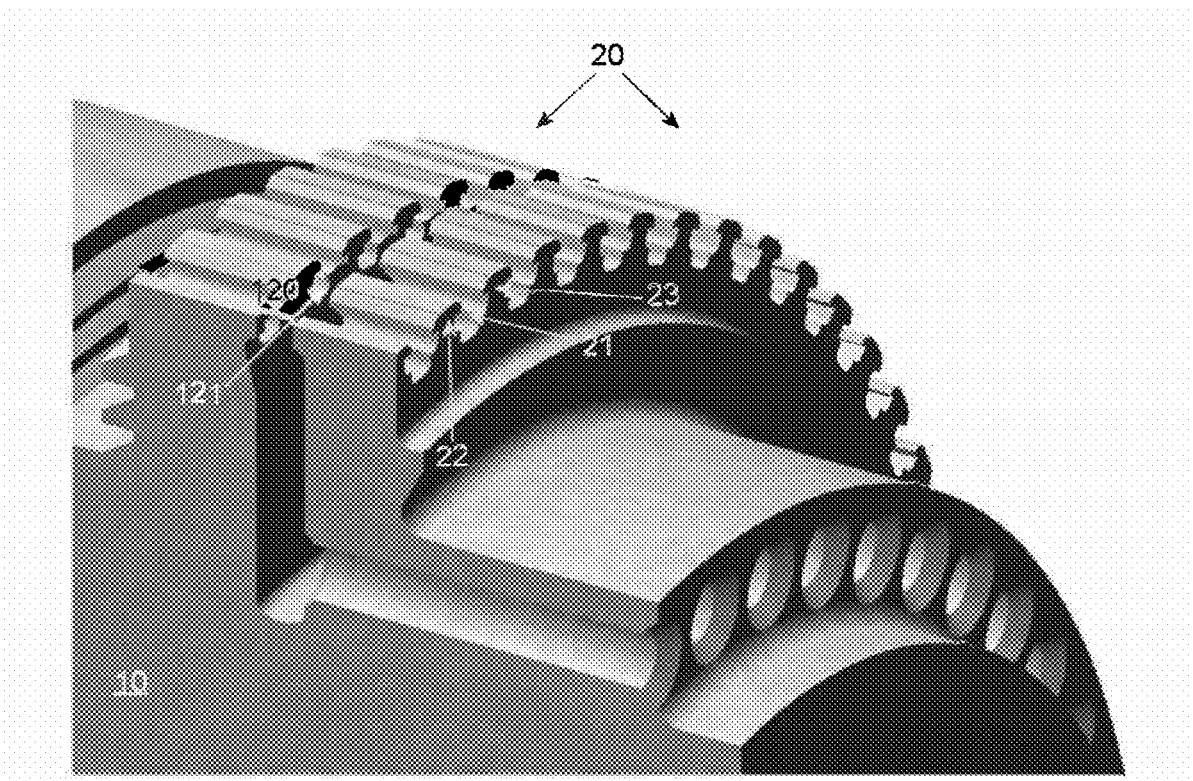
FIG. 11 is a perspective view of a portion of the rotor of FIG. 3 depicting one embodiment of the repair of the opening of FIGS. 8-10.

As depicted in FIG. 11, a plurality of openings, such as opening 120, may extend circumferentially around rotor 10 to form a circumferential groove 121. After curved portions 150, bottom end 42 (FIG. 3) and/or side walls 140 (FIG. 4) of radial portion 40 (FIGS. 3-4) has been machined as described above (e.g., via lathe tools), it is necessary to close circumferential groove 121 and thus opening 120, for example by welding. It is also desirable to return the outer surface (e.g., bridge rails 20) of rotor 10 to its original geometry to complete the repair.

Figure 12:
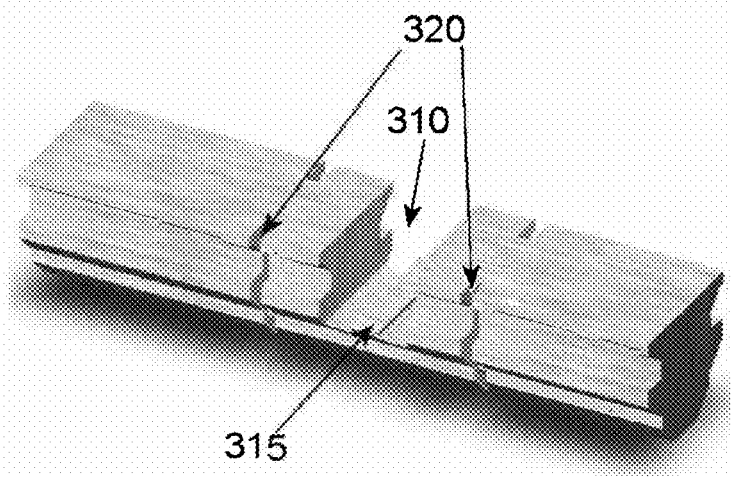
FIG. 12 is a perspective view of a guide block configured to receive in the slots of the rotor of FIG. 11.
Figure 13:
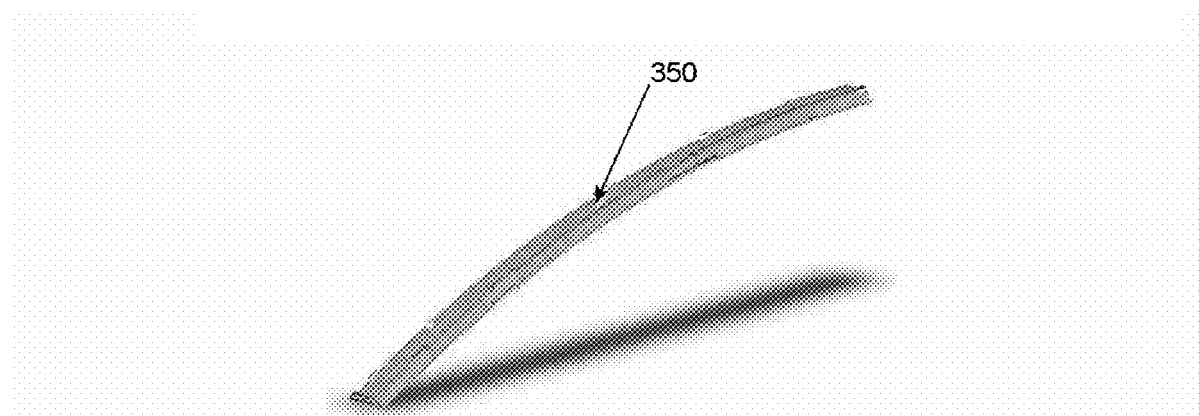
FIG. 13 is a perspective view of a backing band configured to be received in a weld area slot of the guide block of FIG. 12.

In one example, circumferential groove 121 (FIG. 11), including opening 120, may be closed utilizing a guide block 300 as depicted in FIG. 12. Guide block 300 may be configured (e.g., shaped and dimensioned) to be inserted into bridge rail slot 21 between adjacent bridge rails (e.g., bridge rail 22 and bridge rail 23). Guide block 300 may span an entire length of slot 21. Guide block 300 may be manufactured from a material that closely matches rail slot 21 of rotor 10 to minimize element diffusion contamination and migration during the welding processes to be performed. The guide blocks are used to fill the space (e.g., rail slot 21) between intermittent geometries (e.g., rails 20) of part(s) (e.g., rotor 10) to be welded. Also, one or more backing bands (e.g., backing band 350 (FIG. 14)) may be utilized in conjunction with such guide blocks to close an opening (e.g., opening 120) in such a rotor (e.g., rotor 10). Backing Bands 350 may also be manufactured from a material that closely matches rail slot 21 of rotor 10 to minimize element diffusion contamination and migration during the welding processes to be performed. One or more guide blocks (e.g., guide block 300) may also be attached to one or more retaining members or rings (e.g., retaining ring 400) as best depicted in FIGS. 14 and 16 for example, to allow automatic welding of opening 120.

Figure 14:
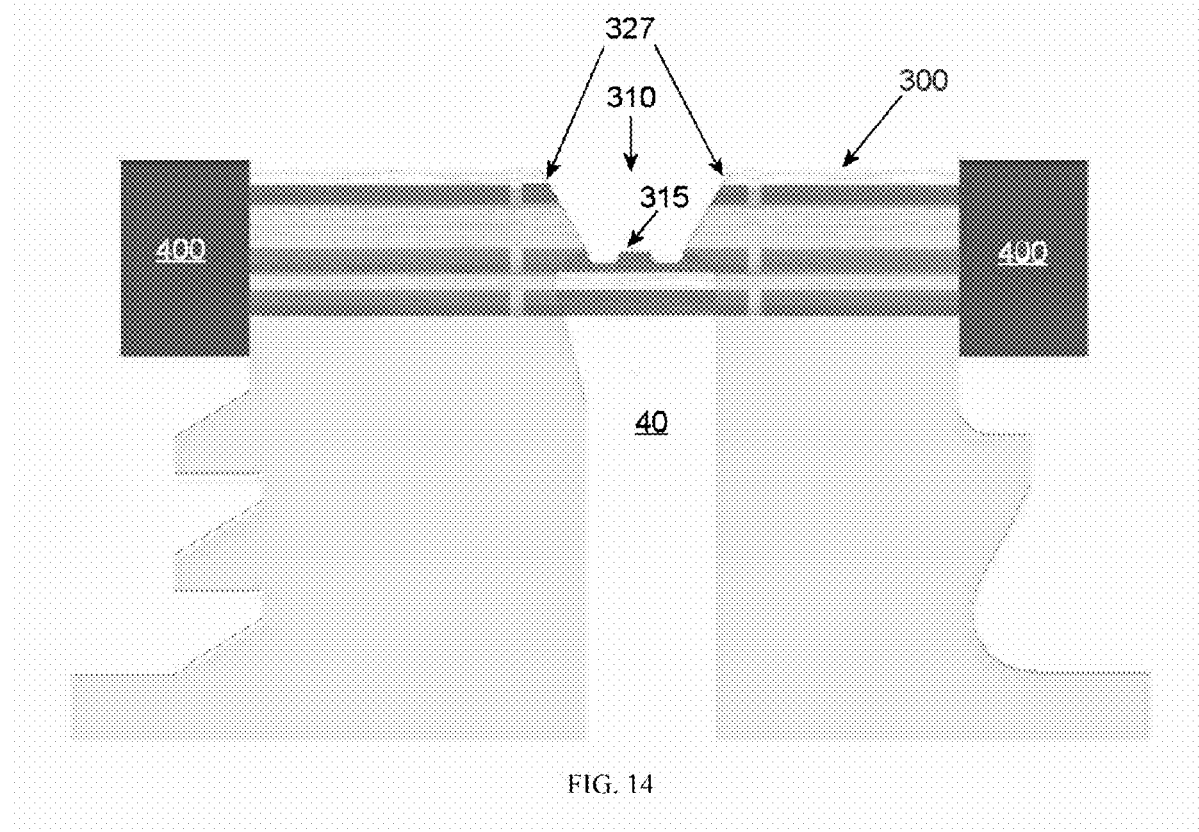
FIG. 14 is a side cross-sectional view of the guide block of FIG. 12 attached to a retaining ring and inserted into one of the slots of FIG. 11.
Figure 15:
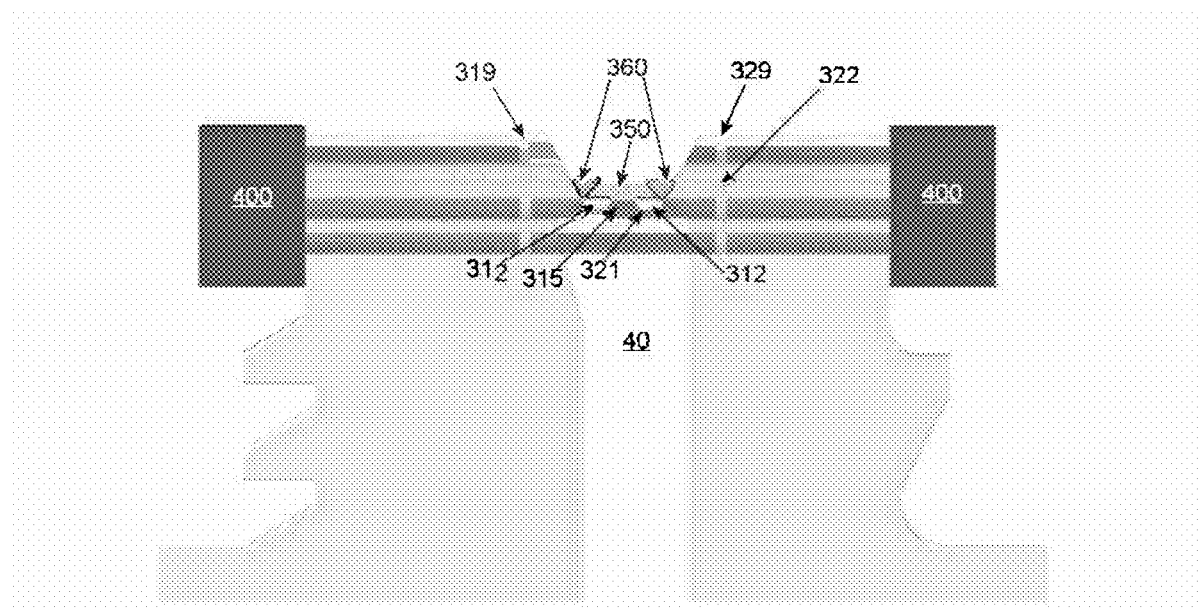
FIG. 15 is a side cross-sectional view of the guide block of FIG. 14 having a backing band welded to the weld area slot thereof.
Figure 16:
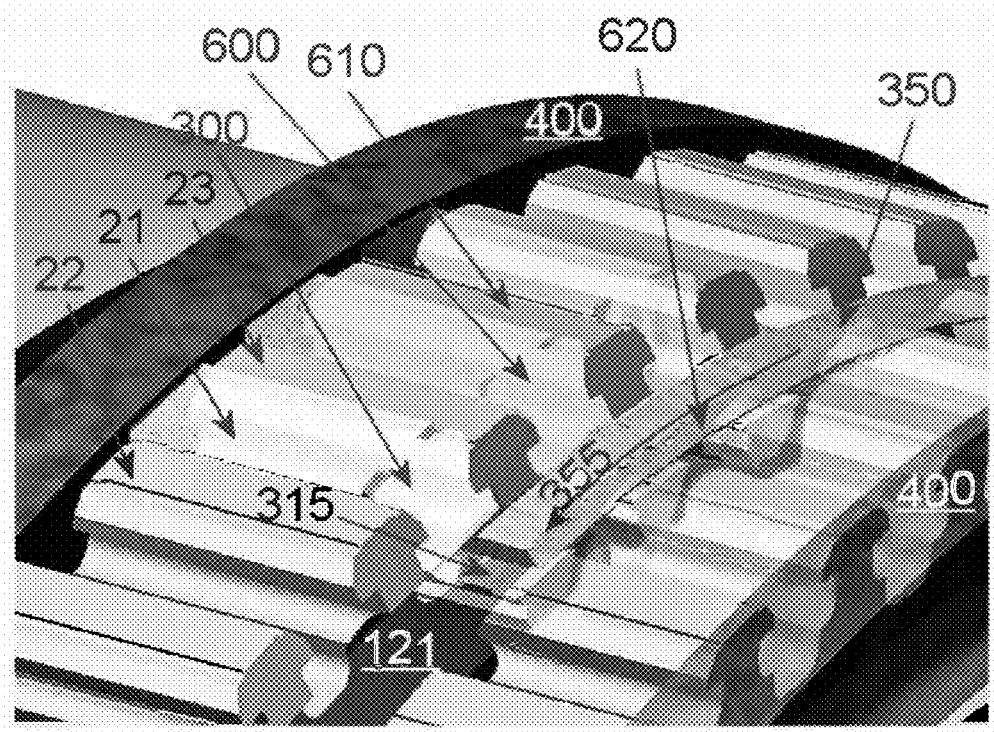
FIG. 16 is a perspective view of the guide block of FIG. 15 connected to the backing band and retaining ring and inserted into a receiving slot of the rotor.

Guide block 300 includes a weld area slot 310 located radially adjacent to opening 120, when block 300 is inserted in slot 21, as depicted in FIGS. 12, and 14-17 for example. By inserting a plurality of guide blocks (e.g., guide block 300) into a plurality of slots (e.g., slot 21) of rotor 10, a continuous circumferential welding groove 355 (i.e., formed by a plurality of slots 310 aligned circumferentially), best shown in FIG. 16, is created around rotor 10. Such circumferential groove allows for automatic welding by forming a continuous circumferential geometry, i.e., by eliminating the intermittent geometry of the grooves (e.g. groove 21) between the bridge rails at both axial sides of the machined cutout.

After the plurality of guide blocks (e.g., guide block 300) is inserted into the plurality of slots (e.g., slot 21) of rotor 10, the retaining rings (e.g., retaining ring 400) are placed around rotor 10 and adjacent to the guide blocks (e.g., guide block 300) and bridge rails 20 (e.g., bridge rail 22 and 23) at both axial ends thereof as depicted in FIGS. 14-17. The guide blocks (e.g., guide block 300) are welded (or otherwise coupled) to the retaining rings (e.g., retaining ring 400) at ends of the guide blocks, creating a continuous rigid support structure as depicted in FIG. 14, for example. A guide block weld preparation 327 (FIG. 14) may be machined into the axial faces of the guide blocks (e.g., guide block 300)) and rail weld preparations (not shown) may be machined into the axial faces of the bridge rails (e.g., bridge rail 22 and 23) to allow such welding. As will be understood by those skilled in the art, a weld preparation may include a shape and/or or texture applied to a receiving surface to promote proper fusion of the weld to the surface to which the weld is to be applied.

The coupling of the guide blocks (e.g., guide block 300) with the retaining rings (e.g., retaining ring 400) aid in the ease of weld preparation machining by providing rigidity during the machining and subsequent welding process. In particular, the rigidity provided maintains a guide block stationary during any machining required to prepare guide block 300 for welding, i.e. to create guide block weld preparation 317 (FIG. 14). Such rigidity may inhibit or prevent "pull" (i.e., weld shrinkage experienced during the cooling and solidification of the newly applied weldment) on the guide blocks that is associated with welding as will be understood by those skilled in the art.

Figure 17:
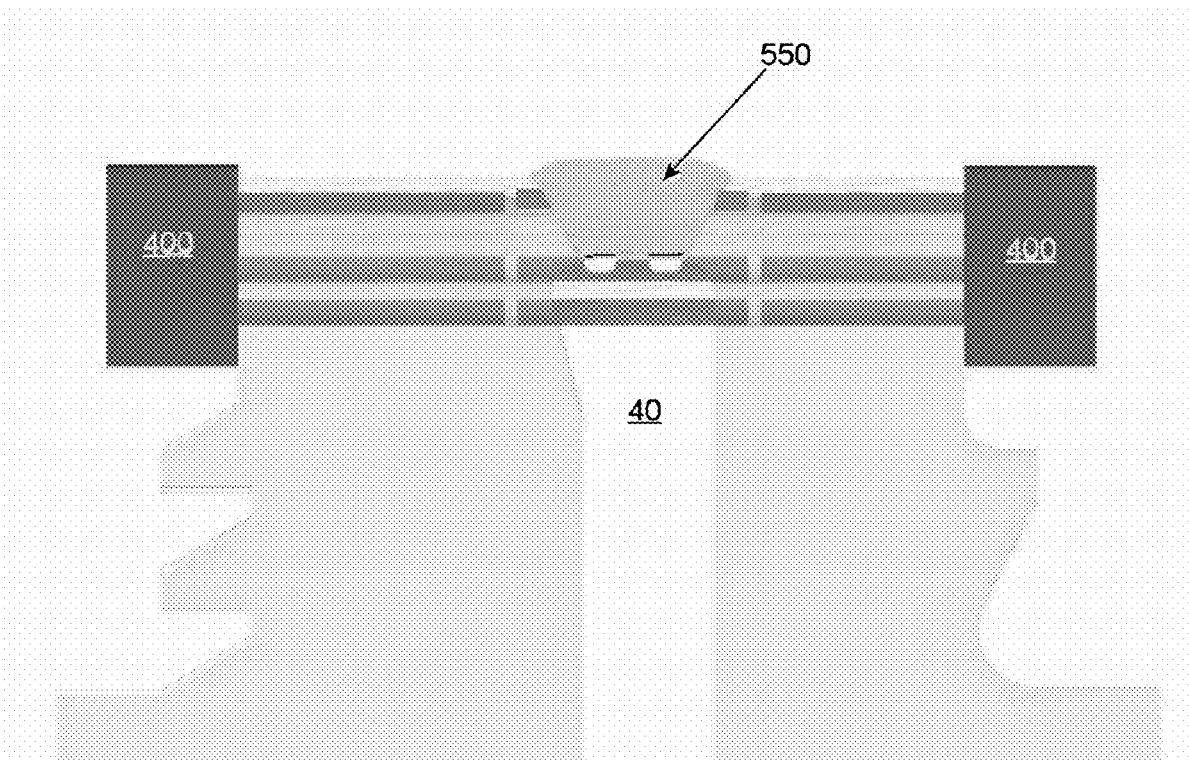
FIG. 17 is a side cross-sectional view of the guide block, backing band, and retaining rings of FIG. 15, and further including a weld build-up in the weld area slot of the guide block.

Once such a weld preparation (e.g., weld preparation 327, FIG. 14) is complete, one or more backing bands (e.g., backing band 350) may be placed at an inner diameter of continuous circumferential groove 355 formed by the plurality of weld area slots ( e.g., weld area slot 310) in bridge rails 20 to close circumferential groove 21 including opening 120 as depicted in FIGS. 15-17, for example. The backing band (s) (e.g., backing band 350) are machined with a correct weld preparation and rolled/formed to a desired shape prior to installation such that the backing bands are configured (e.g., shaped and dimensioned) to be received in the continuous circumferential welding groove 355 and to cover circumferential groove 121 including opening 120.

Guide block 300 may have a positioning ledge 315 to aid in the radial placement of the backing bands (e.g., backing band 350). Positioning ledge 315 is located only in the center of slot 310 and is axially separated from opposed sides of slot 310 by spaces 312, as best depicted in FIG. 15, to prevent or inhibit backing band 350 from fusing to a bottom 321 of weld area slot 310 during the welding process. This is accomplished by placing sufficient distance between positioning ledge 315 and bottom 318. The backing bands are welded in position, e.g. via one or more root welds 360 to opposite sides of slot 310 (e.g., weld preparations 317), as depicted in FIG. 15. This installation creates a 360 degree radial groove (e.g., welding groove 355, FIG. 16) which allows for either automatic or manual welding.

Figure 20:
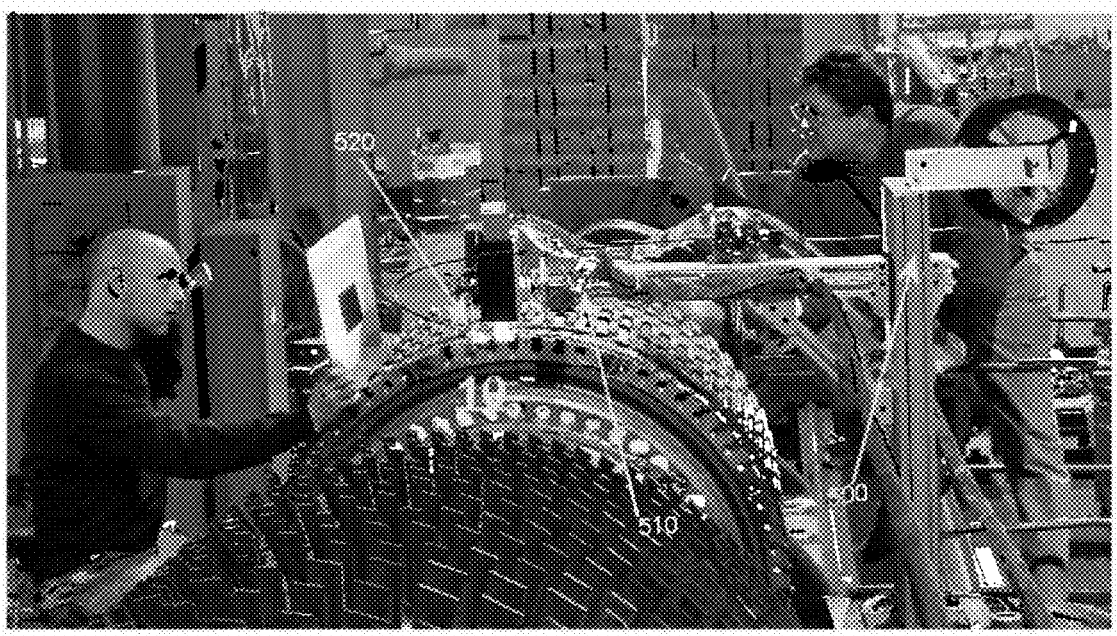
FIG. 20 is a perspective view of an automatic Tungsten Inert Gas (TIG) welding system in the process of welding the rotor of FIG. 11.

For example, rotor 10 may be rotated and groove 355 may be automatically welded using automatic TIG (Tungsten Inert Gas) welding during such rotation. As depicted in FIG. 20, a support frame 500 may support a welding arm 510 aligned such that a tip 520 thereof is adjacent to welding groove 355 to allow welding thereof as rotor 10 rotates. Such welding support frame 500 and welding arm 510 may be configured to perform automatic TIG welding. In particular, a weld (e.g., a weld 550) may be formed by a process of weld metal being deposited continuously about the surface of a rotor (e.g., rotor 10) as the rotor rotates until a sufficient height of weld material is reached, such as the height of rails 20. For example, weld 550 may result from such automatic welding and may fill circumferential groove 355 as depicted in FIG. 17.

As described above and depicted in FIG. 16, guide block 300 may be received in bridge rail slot 21 between bridge rail 22 and bridge rail 23 such that guide block 300 extends over circumferential groove 121 including opening 120. A second guide block 600 may be received in a second rail slot 610 adjacent to, and similar to, slot 21. Backing band 350 may be received in a weld area slot (e.g., weld area slot 310) of the adjacent guide blocks (e.g., guide block 300 and guide block 600). A groove portion 620 of circumferential groove 121 located circumferentially adjacent slot 21 and immediately adjacent rail 22 may thereby be covered by backing band 350 for example. Further, instead of the automatic welding described above, manual welding is possible during the rotation of, or without rotating, rotor 10.

After welding (e.g., weld 550 (FIG. 17)) and any required heat treatment (e.g., heat treatment to provide a required microstructure and material properties in the weldment, heat affected zone (HAZ) and adjacent parent metal to allow for the safe future operation of the component being repaired) are complete, it is necessary to remove the welding support structure (e.g., retaining ring 400 and guide block 300). The retaining rings may be removed first, particularly if they are to be re-used for future repairs. This is accomplished by machining the outer diameter of the guide blocks (e.g., guide block 300) and bridge rails (e.g., bridge rail 22 and bridge rail 23) using standard commercially available lathe cutting tool, for example. Such machining removes the welds to the retaining rings while it restores the outer diameter of the weld repair back to the desired original geometry of bridge rails 20. The retaining rings are freed from the assembly and removed.

Figure 18:
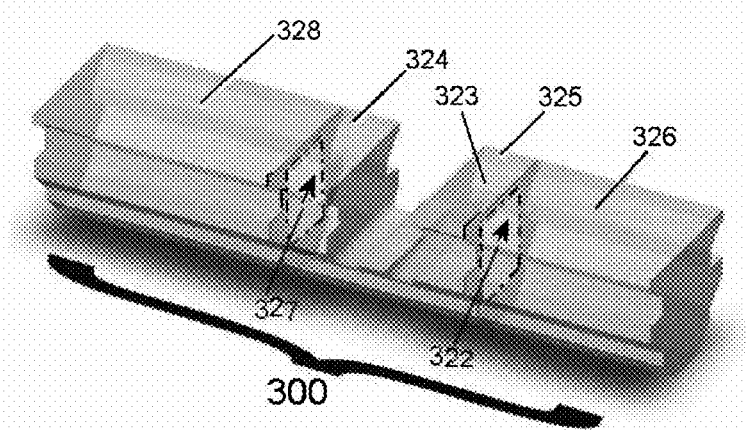
FIG. 18 is a perspective view of the guide block of FIG. 12 further showing a core of the guide block connecting outer portions of the guide block to an inner portion thereof.
Figure 19:
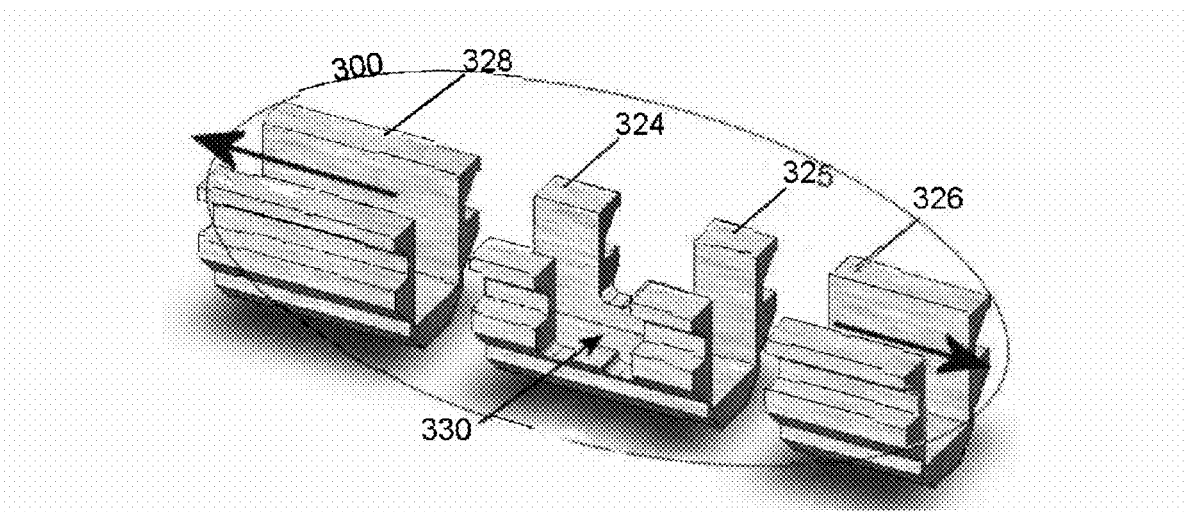
FIG. 19 is a perspective exploded view of the guide block of FIG. 18 after the core thereof has been machined away and the outer portions have been separated from the inner portion.

As depicted in FIGS. 14, 18 and 19, guide block 300 includes one or more breakaway cuts (e.g., breakaway cut 319) axially spaced from slot 310 on both ends of slot 310. Breakaway cut 319 is a space between adjacent portions (e.g., an inner portion 325 and an outer portion 326) of guide block 300, which extends around guide block 300 and which extends to a core 322 of guide block 300. Core 322 is located at a central interior portion of guide block 300, at a distance from an outer surface 323 of guide block 300. Core 322 connects inner portion 325 and outer portion 326 of guide block 300. A space (i.e., breakaway cut 319) may extend completely around core 322 such that inner portion 325 and outer portion 326 are connected only by core 322. Thus, core 322 is also spaced from an adjacent surface (e.g., sides and bottom) of bridge rail slot 21 (FIG. 16), when received in slot 21 (FIG. 16). Also, breakaway cut 319 may be aligned approximately parallel with the one of weld preparations 317 closest thereto when received in slot 21. Breakaway cut 319 may be placed an appropriate longitudinal distance (relative to guide block 300) away from the one of weld preparations 317 closest thereto to prevent the weld (e.g., weld 550) being applied to slot 310 from penetrating into breakaway cut 319.

Guide block 300 also includes a second core 327, connecting an outer portion 328 and an inner portion 324, and a second breakaway cut 329. Guide block 300 may be machined, for example, rough milled axially using a standard commercially available end mill (not shown) selected based on the base material being machined to a depth such that core 322 and second core 327 are removed as depicted in FIG. 19. The breakaway cuts (e.g., breakaway cut 319 and second breakaway cut 329) allow outer portion 326 and outer portion 328 to be separated from inner portion as depicted in FIG. 19 when the cores are removed, because the cores provide the only connection therebetween. Thus, the breakaway cuts may allow for rapid machine removal (e.g., using an end mill (not shown) of the guide blocks and provide a buffer space that protects against accidental machining of the original component's surface geometry. For example, it is not necessary for any machining tool to approach the bottom of slot 21 (FIG. 16) since the bottom of the cores are spaced from the bottom of the slots due to the breakaway cuts (e.g., breakaway cut 319 and second breakaway cut 329) and the tool can stop machining when the cores are removed i.e., at a distance from the bottom surface of slot 21 (FIG. 16). Such machining to remove the cores is referred herein as "rough" machining.

Accordingly, a remaining portion 330 of guide block 300 remains attached (e.g., via a remaining portion of weld 550, FIG. 17) to bridge rail slot 21 after the removal of outer portion 326 and outer portion 328 via "rough" machining. Such "rough" machining may also remove backing band 350 from weld area slot 310. The removal of backing band 350 may be facilitated by the attachment of backing band 350 to to side wall(s) of slot 310 (e.g., weld preparation 317) via the root weld described above to weld area slot 310. In particular, the spaces on opposite sides of ledge 315 inhibit fusion of backing band 350 and ledge 315 which would make removal of backing band 350 more difficult.

Figure 21:
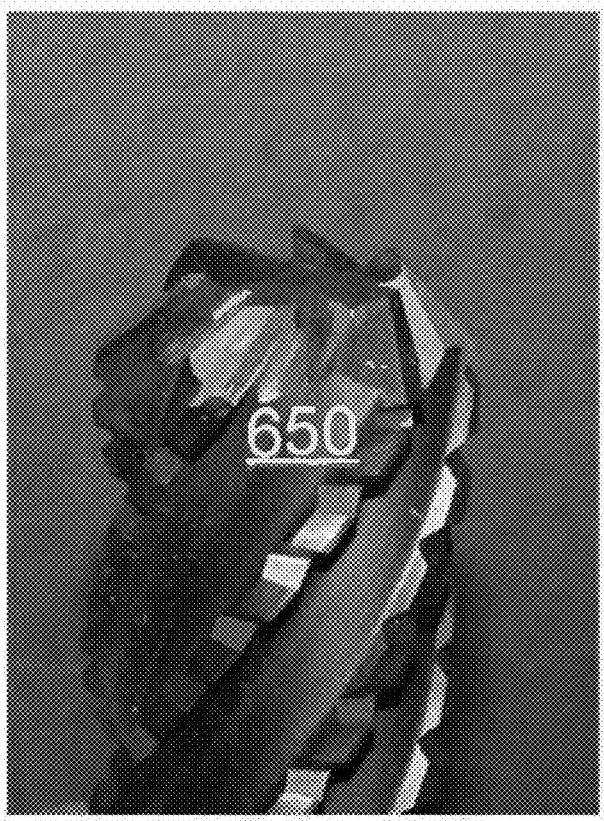
FIG. 21 is a side view of a rotating machining tool utilized to machine the rotor of FIG. 11 after welding closed the opening thereof.
Figure 22:
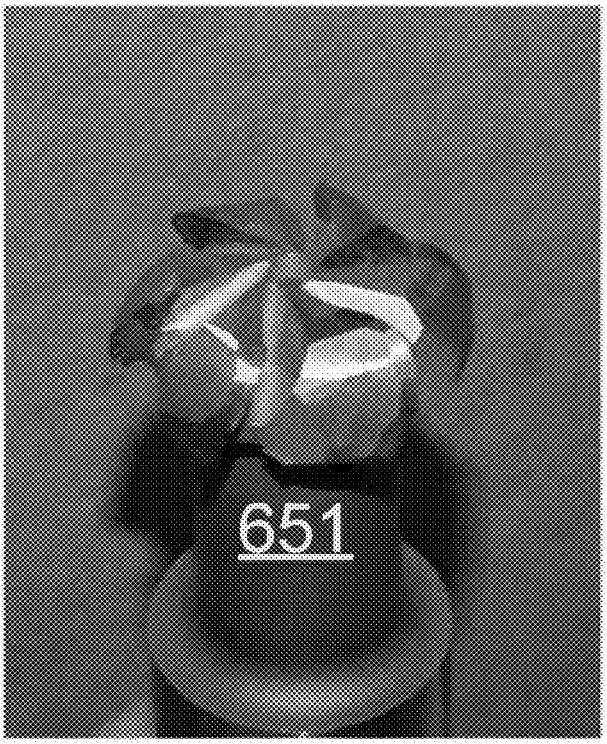
FIG. 22 is a side perspective view of another rotating machining tool utilized to machine the rotor of FIG. 11 after welding thereof.

Remaining portion 330 may be machined to return bridge rail slot 21 to a geometrical configuration as existed prior to the beginning of the repair using rotating machine tools (e.g., modified and taper profiled end mill 650 (FIG. 21) and/or a profile style milling tool 651 (FIG. 22)). Such machining is facilitated, because the original geometry of bridge rail slot 21 remains on both sides of the welded section (i.e., remaining portion 330), which may be used as a reference. The lack of attachment of outer portion 328 and outer portion 326 to slot 21 (e.g., by lack of welding in contrast to remaining portion 330) allows the areas of slot 21 previously occupied by outer portion 328 and outer portion 326 to provide such reference for machining remaining portion 330. Also, the reduced amount of support structure material (e.g., outer portion 328 and outer portion 326), which requires removal by fine machining (e.g., using modified and tapered profiled end mill 650 and/or profile style milling tool 651), resulting from removing outer portion 326 and outer portion 328, may result in reduced final machining time. The amount remaining to be machined away by such fine machining is typically between 0.050"-0.100" on a side (e.g., less than 5% of the total guide block thickness). This amount may differ based on the experience and comfort level of the machinist doing the work. For example, a more experienced machinist may perform rough machining to a greater depth thereby leaving less final machining to be performed.

In an alternate unillustrated embodiment, breakaway cuts may extend only under a bottom portion of guide block 300 (i.e., not completely around core as illustrated in FIG. 18). In this embodiment, when a portion of the guide block above such a breakaway cut is removed by machining as described above, an outer portion would be freed from an inner portion.

Figure 23:
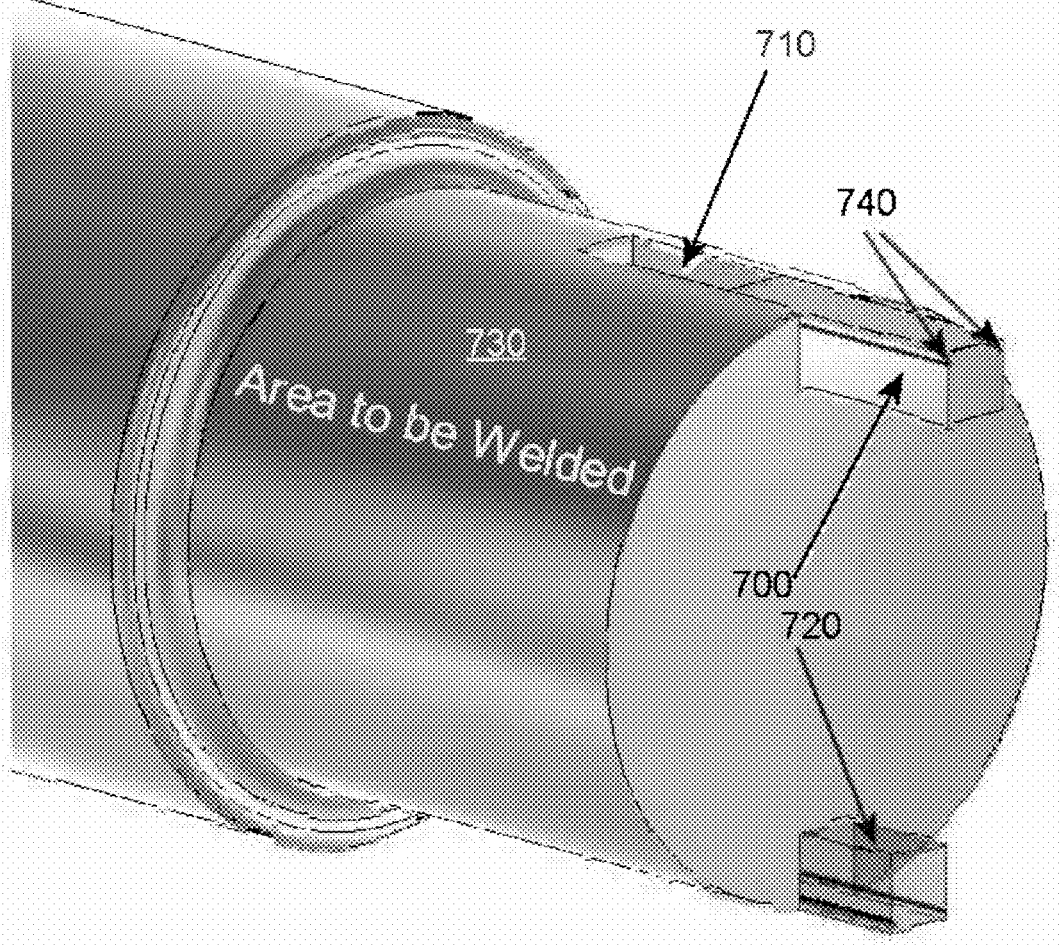
FIG. 23 is a perspective view of a cylindrical member to be welded and guide blocks configured to be received in openings of the cylinder.

In another embodiment depicted in FIG. 23, it may be desired to weld an entire outer portion of a cylinder 700 except for slots 710. Guide blocks 720 may be inserted fully or partially into such slots. A weld (not shown) may then be applied to an outer surface 730 thereby covering slot 710 by automatic or manual welding. Guide blocks 720 may also include machining cutouts 740, which are complementary relative to slots 710 and thereby allow guide blocks 720 to be inserted into slots 710. Similar to the machining of the guide blocks described above, the weld applied to the top portion of guide block 720 and/or all or part of guide block 720 itself, may be machined away such that guide block 720 may be easily removed thereby ensuring access to slot 710 after the welding is complete. For example, cylinder 700 may be a typical rotating-type shaft with keyway slots (e.g., slots 710) shown. Often, the surfaces of the shafts require weld build up and the key slots make welding using automatic processes difficult if not impossible. The use of the guide blocks allows for the continuous welding of the surface using automatic or manual welding processes as described above for rotor 10. The cutouts allow for the re-establishment of the key slots by rapid removal of the guide blocks.

Further, the guide blocks (e.g., guide block 300), backing bands (e.g., backing band 350), and/or retaining rings (e.g., retaining rings 400) may be used in any of various geometries to allow automatic welding of any openings created in a surface. For example, the guide blocks may be utilized with the backing bands or by themselves in round or flat geometries to allow for such automatic welding. Also, the guide blocks, backing bands, and/or retaining rings may be utilized to join not only discontinuous geometries of a single component, but also to join multiple components containing both continuous and discontinuous geometries at the required connection interfaces between such components.

Further, such guide blocks allow for the continuous welding of round components with discontinuous geometries in a "horizontal" turning mechanism i.e., in contrast to the vertical orientation described above relative to rotor 10. This reduces the required weld times and makes the welding repair process (e.g., manual or automatic) capable of being performed within the rotational time constraints required to prevent bowing of the component(s). For example, rotors and shafts will sag (e.g., bow) when supported on the ends thereof and heat is applied. The sag or deflection of the rotor may become progressively worse over time if the shaft or rotor is not rotated. There is a minimal rotational speed required to prevent the sag of these components. The time restraints of rotation and the rotation speeds are based on the component's length, weight, material and other physical and metallurgical characteristics.

Also, the guide blocks allow for direct heat treatment application to round components, e.g. shafts and rotors, during the welding process. For example, electric resistance type heaters (e.g., stationary and sliding) require direct contact with the surface being heated. The guide blocks as discussed above create a continuous outer surface for the application of these heating elements. The once discontinuous geometry on the outer surface of round components are made quasi-continuous by the guide blocks, and this application of surface riding heating and monitoring equipment may be utilized, as will be understood by those skilled in the art.

Also, the support ledges (e.g., positioning ledge 315) described above as supporting the backing bands could also support other support mechanisms such as ceramic backers or chill rings as will be understood those skilled in the art. It will be understood by one skilled in the art that the above described systems and methods for repairing cracks may be applied to rotors of any type of turbines (e.g., steam turbines, gas turbines), other rotating rotors or shafts, or other objects subjected to stresses similar to those found in a turbine environment, which have cavities therein and/or cracking in the walls of such cavities.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method for use in repairing a bridge rail of a rotor of a turbine, the method comprising:
    providing a rotor having an internal circumferentially closed groove bounded by a circumferential portion of the rotor; and
    removing a part of the circumferential portion of the rotor to create an opening to provide access to the groove such that the opening, immediately adjacent the groove, is narrower than the groove; and
    wherein the part of the circumferential portion comprises a portion of a bridge rail of the rotor.

2. The method of claim 1 further comprising filling in the opening.

3. The method of claim 2 wherein the filling in the opening comprises covering the groove by welding the opening.

4. The method of claim 3 wherein the welding causes a heat affected zone of the groove to be moved relative to the location of the zone prior to the removing the part of the circumferential portion.

5. The method of claim 4 wherein the moving of the heat affected zone comprises moving the heat-affected zone from the part of the circumferential portion to a curved portion connecting the opening to a sidewall of the groove.

6. The method of claim 5 wherein the part of the circumferential portion comprises at least a portion of a bridge rail.

7. The method of claim 3 wherein the welding comprises automatically welding.

8. The method of claim 7 wherein the welding comprises welding utilizing an Automatic TIG welding process.

9. The method of claim 3 further comprising machining a portion of a weld formed by the welding to return the at least one bridge rail to an original geometry prior to creating the opening.

10. The method of claim 3 further comprising machining the rotor such that a geometry of an outer circumferential surface of the rotor has a substantially same geometrical configuration after the welding as prior to the removing the part of the circumferential portion.

11. The method of claim 1 further comprising machining curved sidewalls in the groove immediately adjacent the opening.

12. The method of claim 11 further comprising inserting a tool through the opening and machining the groove to form the curved sidewalls.

13. The method of claim 1 wherein the removing the part of the circumferential portion comprises removing a circumferential portion having at least one crack therein.

14. The method of claim 1 further comprising machining an end of the groove furthest from the opening to remove at least one crack therein.

15. The method of claim 1 further comprising inserting a tool through the opening and machining the groove to form sidewalls of the groove.

16. The method of claim 1 further comprising inserting a tool through the opening and machining the groove to form a bottom of the groove.

17. The method of claim 1 wherein the groove comprises a portion of an L-groove configured to cool the rotor.

18. The method of claim 1 wherein the creating the opening comprises creating the opening offset from sidewalls of the groove.

19. The method of claim 1 wherein the groove comprises a radial portion of the groove aligned substantially radially relative to the rotor.

20. The method of claim 1 wherein an original fabrication weld closing the groove extended a full width of the groove and wherein the part of the circumferential portion comprises a second width less than the full width of the groove.

* * * * *